Feb. 12, 1929.
C. S. McCHESNEY
1,701,859
MOLD BREAKING DEVICE
Filed Oct. 26, 1927
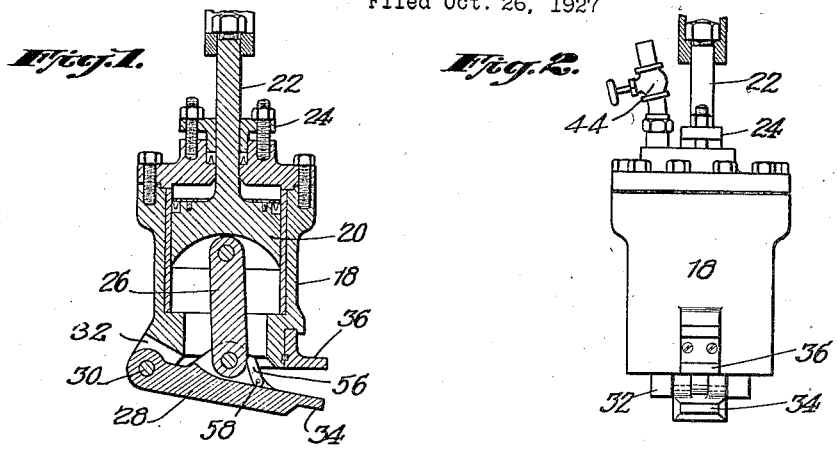
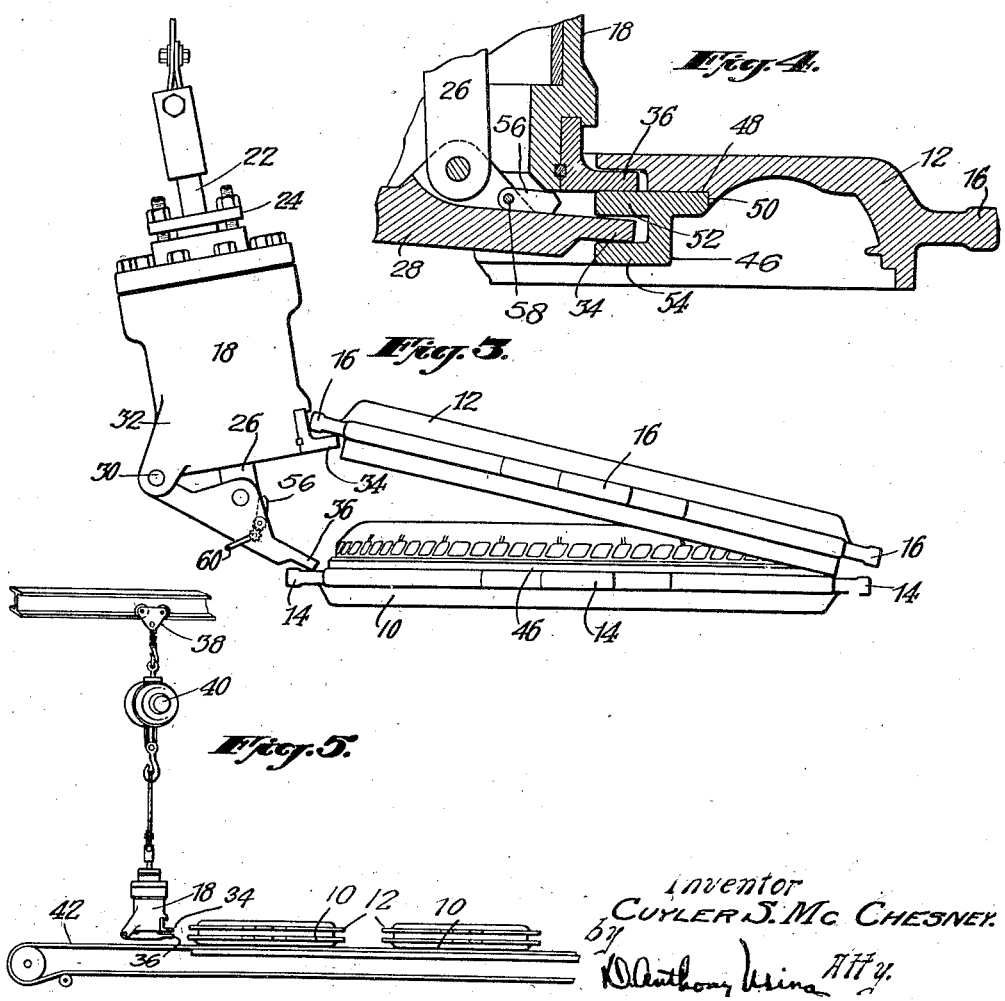
Inventor
CUYLER S. McCHESNEY.
by D. Anthony Usina Atty.

Patented Feb. 12, 1929.

1,701,859

UNITED STATES PATENT OFFICE.

CUYLER S. McCHESNEY, OF KENMORE, NEW YORK, ASSIGNOR TO DUNLOP TIRE AND RUBBER CORPORATION, OF BUFFALO, NEW YORK, A CORPORATION OF NEW YORK.

MOLD-BREAKING DEVICE.

Application filed October 26, 1927. Serial No. 228,821.

This invention relates to apparatus adapted to separate molds such as used in the manufacture of automobile tires or shoes.

In the manufacture of automobile tire shoes or casings, it is known to those skilled in the art that after a tire has been vulcanized in a mold, the separate parts of the mold stick together and cannot be separated except by the insertion of a lever or other prying device. It has heretofore been the practice to open or separate the molds manually. This is a slow and laborious task.

My invention provides power means for separating molds and speeds up production and eliminates the muscular exertion heretofore required for separating the mold parts.

The invention will be apparent from the following specification when read in connection with the accompanying drawings and will be pointed out with particularity in the appended claims.

In the drawings, Fig. 1 is a longitudinal section illustrating one embodiment of the invention;

Fig. 2 is an elevation viewed from the right of Fig. 1;

Fig. 3 is an elevation illustrating my mold breaking device in the act of separating one mold section from another;

Fig. 4 is a cross-sectional view through one end of a tire mold illustrating how my mold breaking device is adapted to be used to separate the bead mold ring from the outer casing of the mold; and Fig. 5 is a diagrammatic view showing a suitable support for the mold breaker and a conveyor for the tire molds.

Referring first to Fig. 3, 10 and 12 represent respectively the lower and upper sections of a tire mold such as used for vulcanizing automobile tire shoes. When such molds are passed into the heating chamber of a vulcanizer, the tread projections and depressions of the tire closely contact with the corresponding parts of the mold and are compressed into the cavities of the mold. This makes it difficult under ordinary conditions to separate the two halves 10 and 12 of the mold. Heretofore it has been customary to insert a pinch bar or other lever between the flanges 14 and 16 of the mold so as to pry the same apart. This operation requires considerable muscular effort and is slow and inefficient and one which tires the workmen and slows up production.

My improved mold breaker makes it unnecessary for the operators to exert muscular effort in separating the mold sections.

My improved apparatus includes a portable cylinder 18 having a fluid pressure actuated piston 20 therein. The piston 20 is provided with a shank 22 which passes through a suitable stuffing box 24. The piston 20 is connected by means of a sturdy link 26 with a jaw 28 which is pivoted at 30 to a lug 32 formed on the cylinder. At its free end, the jaw 28 carries a comparatively narrow tooth 34. In juxtaposition to the tooth 34, the cylinder has secured thereto a fixed tooth 36.

The mold breaker is supported from a suitable overhead trolley such as indicated at 38 in Fig. 5 which has suspending therefrom a suitable electric hoist 40 by means of which the breaker can be lowered and raised to and from the working position. As the molds are brought to position on a conveyor 42, the operator lowers the apparatus and inserts teeth 34 and 36 between the flanges 14 and 16 of the mold. He then operates the valve 44 so as to permit suitable fluid pressure to enter the cylinder and force the piston downwardly so as to separate the mold sections to the position illustrated for example in Fig. 3.

The apparatus is also useful in separating the inner mold or bead rings from the outer mold rings. Fig. 4 shows one end of the tire mold and illustrates the inner mold or bead rings 46. It is noted that said ring 46 is seated against surfaces 48 and 50 formed in the outer ring. My apparatus is useful in breaking the connection between the inner ring 46 and outer ring. Because of the construction of the inner ring, it would be difficult ordinarily to separate the same from the outer ring. My improved mold breaker is so designed that this difficulty is overcome. The inner ring is formed with flanges 52 and 54. I provide means so that when desired, the jaw 28 will be stopped in such position that the distance between its tooth 34 and fixed tooth 36 is sufficient to permit said teeth to straddle opposite faces of the flange 52 of the mold ring. In other words, when the jaw 28 is closed, I provide means for stopping the same so that the space between the fixed tooth and the movable tooth is slightly greater than the thickness of the flange 52. I ensure that the parts will stop in this position by provision of a member 56 which is pivoted at 58 to a lug carried by the movable jaw 28. When the member 56 is in the position illustrated in Fig. 4, it will serve as a stop to limit the closing movement of the jaw 28 and when the jaw has moved to the extent permitted by this stop, the space between the tooth 34 and the tooth 36 will be greater than the thickness of flange 52 of the mold ring. On the other hand, when it is desired to have the teeth 34 and 36 close together so as to permit insertion between the closely spaced flanges 14 and 16, the member 56 will be swung counter-clockwise as in Fig. 1. The member 56 may be actuated by a suitable finger piece 60 and inoperatively held in either of its positions by a suitable impositive lock.

While I have described quite specifically the detail features of the embodiment of the invention illustrated, it is not to be construed that I am limited thereto since various modifications may be made by those skilled in the art without departing from the invention as defined in the appended claims.

What I claim is:—

1. A device of the character described adapted to separate mold sections comprising a cylinder having one mold-engaging member fixedly secured thereto, and a mold engaging jaw pivotally secured thereto and fluid pressure actuated means for moving said jaw.

2. A device of the character described adapted to separate mold sections comprising a cylinder having a projection secured thereto, a jaw pivoted to said cylinder and having a tooth in approximate alignment with said projection and a piston operatively connected with said jaw.

3. A device of the character described comprising a pair of members adapted to engage mold parts to be separated and power means for separating said members, including a pivoted stop secured to one of said members and adapted when in one position to limit the movement of said members toward each other.

4. A device of the character described adapted to separate mold sections comprising a cylinder having a projection secured thereto, a jaw pivoted to said cylinder and having a tooth approximately opposite said jaw, a piston operatively connected with said jaw, a movable stop secured to said jaw and adapted when in one position to limit the movement thereof, and operating means on the exterior of said jaw for actuating said movable stop.

In witness whereof, I have hereunto signed my name.

CUYLER S. McCHESNEY.